United States Patent
Lucas et al.

(10) Patent No.: US 7,822,074 B2
(45) Date of Patent: Oct. 26, 2010

(54) SYNCHRONIZATION BETWEEN UNCOORDINATED TIME DIVISION DUPLEX COMMUNICATION NETWORKS

(75) Inventors: Richard C. Lucas, Ash Vale (GB); David N. Freeman, Basingstoke (GB); Jonathan A. Gibbs, Winchester (GB)

(73) Assignee: Motorola Mobility, Inc., Libertyville, IL (US)

( * ) Notice: Subject to any disclaimer, the term of this patent is extended or adjusted under 35 U.S.C. 154(b) by 261 days.

(21) Appl. No.: 12/115,562

(22) Filed: May 6, 2008

(65) Prior Publication Data
US 2009/0279457 A1 Nov. 12, 2009

(51) Int. Cl.
*H04J 3/06* (2006.01)
(52) U.S. Cl. ................. 370/516; 370/252; 455/63.1
(58) Field of Classification Search .......... 370/252, 370/516; 455/63.1
See application file for complete search history.

(56) References Cited

U.S. PATENT DOCUMENTS

| | | | |
|---|---|---|---|
| 6,470,006 B1 | 10/2002 | Moulsley | |
| 7,133,673 B2 | 11/2006 | Zeira et al. | |
| 2002/0041584 A1 * | 4/2002 | Sashihara | 370/337 |
| 2004/0166864 A1 | 8/2004 | Hill et al. | |
| 2004/0208140 A1 * | 10/2004 | Noguchi et al. | 370/328 |
| 2004/0235506 A1 | 11/2004 | Roettger et al. | |
| 2005/0048985 A1 | 3/2005 | Haartsen | |
| 2006/0116081 A1 * | 6/2006 | Shah | 455/67.11 |
| 2006/0215611 A1 | 9/2006 | Nakagawa et al. | |
| 2007/0280096 A1 * | 12/2007 | Yanover et al. | 370/201 |
| 2008/0139212 A1 | 6/2008 | Chen et al. | |
| 2009/0047913 A1 | 2/2009 | Kuru | |
| 2009/0122782 A1 * | 5/2009 | Horn et al. | 370/350 |

FOREIGN PATENT DOCUMENTS

| | | |
|---|---|---|
| EP | 0917315 B1 | 4/2005 |
| EP | 0763300 B1 | 11/2005 |
| WO | 9805131 | 2/1998 |
| WO | 0062445 | 10/2000 |

* cited by examiner

*Primary Examiner*—Jason E Mattis

(57) ABSTRACT

An apparatus and method for synchronization between uncoordinated Time Division Duplex (TDD) communication networks includes a first step (300) of measuring an interference level on channels available to a base station. A next step (302) includes choosing the channel having the lowest interference level. A next step (304) includes determining that the interference is from a base station. A next step (306) includes calculating an interference profile over the frame cycle. A next step (308) includes establishing a peak interference level. A next step (310) includes aligning the base station frame timing in response to the peak interference level.

9 Claims, 2 Drawing Sheets

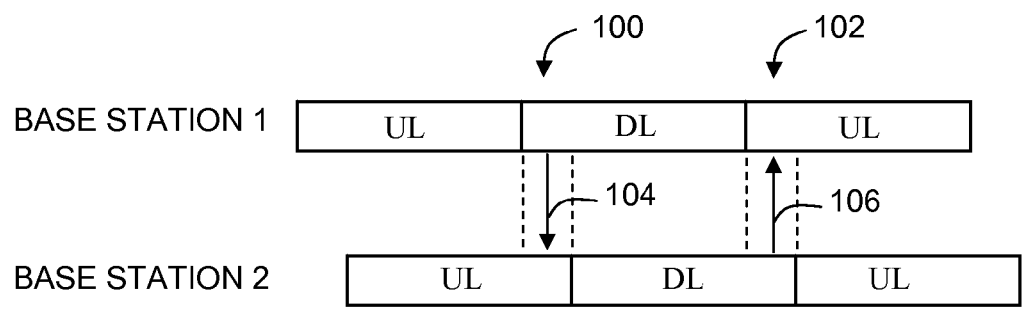
FIG. 1 - PRIOR ART -
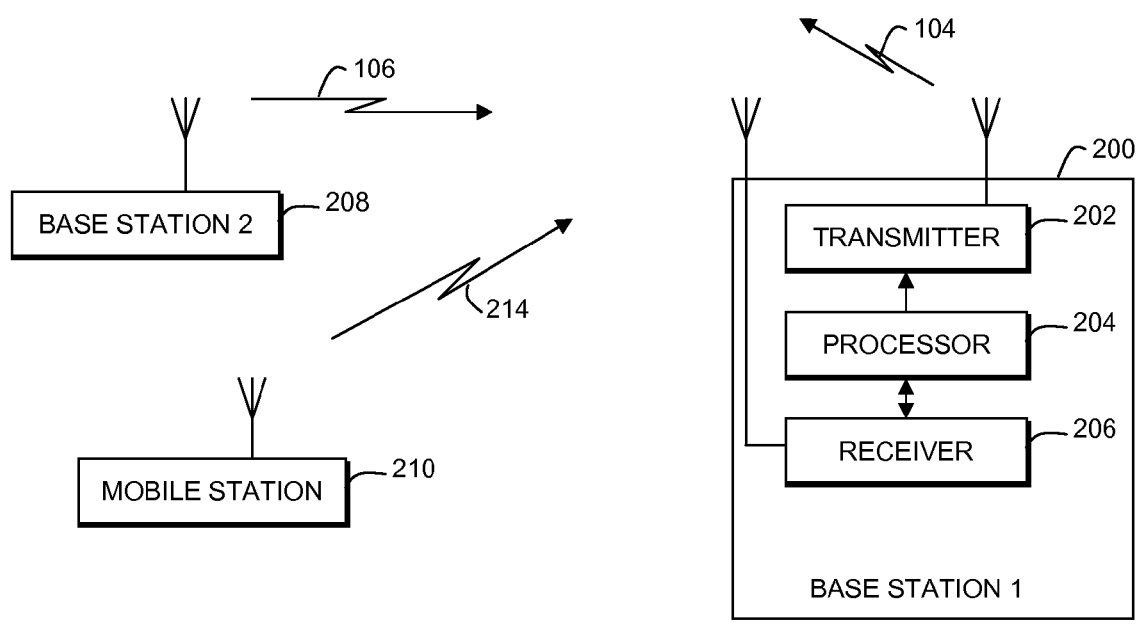
FIG. 2

SYNCHRONIZATION BETWEEN UNCOORDINATED TIME DIVISION DUPLEX COMMUNICATION NETWORKS

FIELD OF THE INVENTION

This invention relates to multiple wireless communication networks, in particular, to a mechanism for synchronization between uncoordinated communication networks.

BACKGROUND OF THE INVENTION

In the field of this invention it is known that radio frequency resources are both scarce and expensive. Hence, in designing and operating cellular-based systems, spectrum efficiency must be optimised. This is critical, particularly in the current wireless communication climate, where several operators may compete for customers within the same frequency band using a number of known spectrum allocation techniques. However, in a scenario involving uncoordinated networks (i.e. where there is no central allocation authority between different networks, such as for example wireless local area networks (LANs) such as 802.11b and Bluetooth™, the digital European cordless telephone (DECT) standard, or other ad-hoc shared-spectrum networks, it is not possible to collate resources centrally.

In effect, mobile stations (MSs) or base stations (BSs) on one network have no knowledge of interference that they are causing to MSs/BSs on the other network. Such networks typically operate using dynamic channel methods that select a channel for operation depending on the level of interference measured on that channel. For example, where multiple TDD systems are operating in a band, on adjacent channels, or on adjacent sites on the same channel, interference between networks (or even spectrum required for a guard band) occurs when one network is transmitting, and another unrelated network is receiving. The predominant form of interference is in the form of BS-to-BS, and MS-to-MS, such as where the downlink transmission of BS is interfering with the uplink of another BS.

FIG. 1 illustrates this existing problem where one BS (Base Station 1) operates in one TDD network, and another BS (Base Station 2) operates in a different TDD network. Inasmuch as the two different TDD networks are uncoordinated they may not be synchronized in time, as shown. In particular, there may be a time 100 where a downlink transmission from BS1 may interference 104 with an uplink transmission for BS2. Similarly, there may be a time 102 where an uplink transmission for BS1 may be interfered with 106 by a downlink transmission from BS2.

This interference could be significantly reduced if the networks were synchronised. However, for smaller unconnected networks there is no central mechanism to force synchronisation, and therefore the networks operated in an uncoordinated manner. This is exacerbated for TDD systems that have no frequency planning, as in unregulated spectrum, e.g. WiFi. As such, these uncoordinated systems do not enable fair access to the available communication resources for each network sharing the resource—that is one network may so degrade the quality of the other to effectively prevent it from operating properly.

Thus, there exists a need in the field of the present invention to provide an apparatus and a method of sharing a communication resource that encourages a fair allocation of resources, particularly in an uncoordinated network scenario, wherein the abovementioned disadvantages may be alleviated.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 shows a graph of interference conditions that can presently exist in prior art communication networks;

FIG. 2 shows an overview block diagram of a wireless communication system supporting multiple technologies/networks, in accordance with the present invention.

Figure 3:
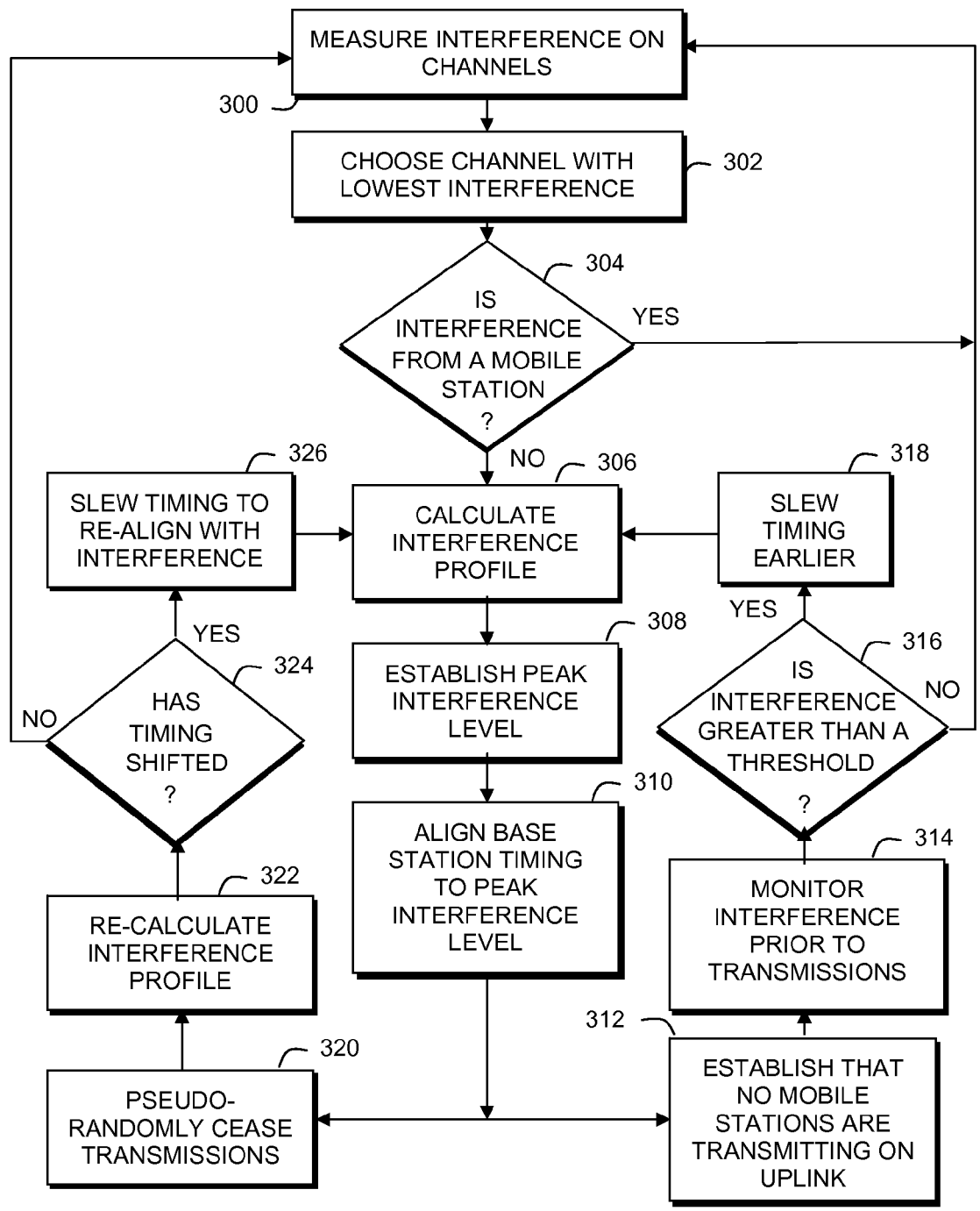
FIG. 3 is a flow chart illustrating a method, in accordance with the present invention.

Skilled artisans will appreciate that common but well-understood elements that are useful or necessary in a commercially feasible embodiment are typically not depicted or described in order to facilitate a less obstructed view of these various embodiments of the present invention.

DESCRIPTION OF THE PREFERRED EMBODIMENTS

The preferred embodiment of the present invention provides a framework wherein a BS on one network can provide synchronization to an interfering BS in another network. In particular, the present invention minimizes uplink interference by monitoring TDD downlinks so as to allow a BS to synchronize itself to uncoordinated infrastructure in the locality, in order to reduce the overall level of interference for a TDD system by having the BS to assess the time profile of the interference power on the channel(s), and align its transmit duty cycle with the interference.

In particular, the present invention provides an integrated optimization solution for reducing co-channel interference between TDD base stations of different communication networks by synchronizing their transmissions in time such that during a BS receive timeslot, there is no other BS transmitting. The present invention has applicability for Wi-Fi base stations, but is also relevant for other communication systems.

Referring first to FIG. 2, there is shown a block diagram of a base station (BS1 200) adapted to support the inventive concepts of the preferred embodiments of the present invention. Although the preferred embodiment of the present invention is described with reference to a base station, it is within the contemplation of the present invention that the inventive concepts can be applied equally to other wireless communication units, such as mobile stations in cellular-type networks, or devices with wireless Bluetooth™ capabilities, or indeed any other device that has an ability to cause radio frequency interference to other wireless communication units.

BS1 200 can have an antenna that can be coupled to a duplex filter or antenna switch that provides isolation between a receiver and a transmitter chain within the BS, or the BS can provide separate antenna structures for the transmit (Tx) and receive (Rx) functions. As known in the art, the receiver 206 typically includes receiver front-end circuitry (effectively providing reception, filtering and intermediate or base-band frequency conversion) that is coupled to a signal processor function 204. An output from the signal processing function is coupled to a transmitter 202 that provides transmissions 104 to MSs being served by the base station in its locality. In particular, in response to the processor 204, a transmit signal is passed through modulation circuitry and a power amplifier of the transmitter 202 to be radiated from the Tx antenna. The transmitter/modulation circuitry 202 and receiver front-end circuitry 206 comprise frequency up-conversion and frequency down-conversion functions (not shown).

During operation, the receiver 206 is operable to receiving an interfering signal 106 from other base stations (BS2 208) or receiving an interfering signal 214 from other mobile stations 210. The receiver 206 in conjunction with the processor 204 is operable to measure the power levels of interfering signals 106, 214 from a BS 208 or MS 210 operating within a band, on adjacent channels, or on adjacent sites on the same channel of the BS1 200. The processor function 204 can also include a memory for storing interference measurements and a timer 118 to control the timing of operations (transmission or reception of time-dependent signals) within the base station 200.

Of course, the various components within the BS unit 200 can be arranged in any suitable functional topology able to utilise the inventive concepts of the present invention. Furthermore, the various components within the BS unit 200 can be realised in discrete or integrated component form, with an ultimate structure therefore being merely based on general design considerations. It is within the contemplation of the invention that the operating requirements of the present invention can be implemented in software, firmware or hardware, with the function being implemented in a software processor (or indeed a digital signal processor (DSP)) being merely a preferred option. The inventive concepts herein described can be applied to a situation where there are two such networks that may be able to evolve individually, but have no way of adjusting respectively their communication habits with respect to each other. For example, their lack of appreciation of the other network's needs could be due to the use of different technologies, or for security reasons when both networks use the same technology, or perhaps even due to the usage patterns of each network being different.

Referring back to FIG. 2, a base station (BS1 200) is operable to synchronize to a Time Division Duplex (TDD) communication network of a communication system that comprises one or more uncoordinated TDD communication networks supporting communications for a plurality of mobile stations. BS1 200 is operable on a first TDD communication network, and BS2 208 and MS 210 are operable in a second, uncoordinated TDD communication network. The first and second networks can operate within a band, on adjacent channels, or on adjacent sites on the same channel, which is typical in a wireless cell-based communication system, such that interference can occur between the networks. The present invention is particularly concerned about a BS 200 in one network that is interfered with by a BS 208 in another network.

In operation, the receiver 206 of the BS 200 is operable to scan all channels available to the base station, and measure an interference level on the channels. The processor 204 is operable to choose the channel having the lowest time-averaged uplink path noise floor (i.e. interference) over a period long enough for base station's receive frame cycle. Having chosen such a channel, a complete cycle of the frame is analysed by the processor 204 and an interference power level profile is calculated on a chip-by-chip time basis throughout the frame cycle in order to establish a peak interference level. The BS then determines whether the interferer is a BS or an MS. If the interference is due to an MS, then the processor 204 ignores it.

In particular, the BS can determine whether the interferer is an MS or another BS based upon the transmission patterns of the interferer. This will vary according to the particular TDD protocol being used, but would be based upon a permutation of the following transmission patterns: a) in a protocol where the BS is likely to be supporting a number of individual MS, then the duty cycle of BS will tend to be more active than an MS (i.e. the BS transmits for longer on each cycle), b) in a protocol where the BS broadcasts its presence to the MSs, then the BS will be transmitting on every cycle, c) where a variable downlink/uplink ratio is employed, then the BS is the unit that starts its transmission at the same point in the cycle every time, d) in a protocol where a BS frequently broadcasts identifiers in clear for their own MSs to identify with, then this identifier could be used to identify that BS as the interferer, and e) the BS can scan adjacent channels, wherein if interference is seen, an adjacent channel can be examined and if the interference appears there too, but at a certain dB level higher, then the interference being seen is adjacent channel interference. In this case, BS transmissions can be seen elsewhere on that adjacent channel then the adjacent channel mobile interference can be ignored when choosing how to align the transmit cycle.

If it is determined that the peak interference is due to a BS transmission 106 then the processor 204 directs the transmitter 202 to align the base station frame timing in response to the peak interference level. In particular, the transmitter 202 aligns its transmissions to coincide with the region of the cycle with the maximum interference power. Specifically, the transmitter 202 times the rising edge of its transmissions 104 to coincide with the rising edge of the maximum interference power level 106 so that the BS 200 is not receiving during a time of maximum interference. This effectively ensures that its uplink receives most protection from the interference 106 of the second BS 208. The rising edge is used because the present invention assumes that the Tx/Rx duty cycle is not fixed which can lead to a timing of a trailing edge of the interference level that may change due to the Tx/Rx duty cycle.

Since the BS 200 has now timed its transmissions 104 to align with the interference 106, the BS 200 will not know if a peak of the interference 106 shifts to a later time in the frame since the interference is effectively masked by the transmissions 104, although an earlier time shift of interference in the frame could be detected since this would show up as a rise in received noise before transmissions 104 start. The present invention provides two effective solutions to determine if the interference peak has time shifted.

In a first solution, once the timing change is aligned and steady, the processor 204 pseudo-randomly directs the transmitter 202 to cease transmissions, whereupon the processor 204 re-calculates the interference profile over a frame cycle, and if the timing position of the peak interference level has shifted, the processor directs the transmitter to slowly slew the base station frame timing to re-align with the peak interference level in a manner which permits mobile stations served be the base station to remain synchronized therewith. Preferably, the BS 200 will avoid false measurements due to intended uplink transmissions by: disabling uplink transmissions for the cycle, postponing measurement, or receive, compute & subtract the intended signal. In particular, where a BS1 is trying to assess the level of received interference from another BS2, it can either instruct its own MS1s not to transmit while it makes the measurement. Alternatively, BS1 can make the measurement, and if it has received a transmission from MS1 during the measurement window, it can determine the received signal from MS1, and subtract this from the total received to work out the interference. Although, transmission may be ceased in a random manner, it is preferred to do this only pseudo-randomly since all base stations in the network will be using the same interference mitigation procedure of the present invention, and the cessation can be done pseudo-randomly to ensure that one BS is not off at the same time as another BS is on, to ensure that the cessation does not confuse other BSs.

In a second solution, the processor further establishes that no mobile stations are transmitting on an uplink, and directs the receiver to monitor interference power immediately prior to the transmitter transmissions, and if the interference level rises abruptly to greater than a threshold level immediately prior to the transmitter transmissions, indicating that the transmitter is transmitting too late in the frame cycle, the processor directs the transmitter to slew the base station frame timing to be earlier than the present frame timing in the frame cycle to re-align to the interference peak. The threshold can be determined through experimentation to provide the best system interference performance. Optimum performance is based on using a combination both solutions; interference power monitoring of noise in the uplink when there is no incoming traffic, and a periodic stop transmission & listen.

Referring now to FIG. 3, a flowchart illustrates a method for synchronization between uncoordinated Time Division Duplex (TDD) communication networks that includes a first step 300 of measuring an interference level on channels available to a base station.

A next step 302 includes choosing the channel having the lowest time-averaged interference level for one receive frame cycle of the base station.

A next step 304 includes determining whether the interference is from a base station by permutation of the transmission patterns, wherein if the interference is from a mobile station, then the interference is ignored. In the interference is not from a base station, the method will repeat resulting in an occasionally check being made to see if the timing of interference from the other BS has drifted, then shift timing accordingly as described below.

A next step 306 includes calculating an interference profile over the frame cycle. Preferably, this step 306 is performed on a chip-by-chip time basis.

A next step 308 includes establishing a peak interference level.

A next step 310 includes aligning the base station frame timing in response to the peak interference level by timing a rising edge of the base station transmissions to coincide with the rising edge of the peak interference level.

The present invention provides two techniques to determine if the interference peak has shifted in time.

In a first technique, the present invention further comprises the steps of: pseudo-randomly ceasing 320 base station transmissions; re-calculating 322 the interference profile over a frame cycle; and if the timing position of the peak interference level has shifted 324, slewing 326 the base station frame timing to re-align with the peak interference level in a manner which permits mobile stations served by the base station to remain synchronized therewith, and thereafter returning to normal interference calculations 306. If the timing position of the peak interference level has not shifted 324, the process resumes from the beginning 300.

In a second technique, the present invention further comprising the steps of: establishing 312 that no mobile stations are transmitting on an uplink (which can be done be explicitly disabling mobile station uplink transmissions for the cycle); monitoring 314 interference power immediately prior to base station transmissions; and if the interference level rises to greater than a threshold level 316 immediately prior to the base stations transmissions, slewing 318 the base station frame timing to be earlier than the present frame timing in the frame cycle, and thereafter returning to normal interference calculations 306. If the interference level does not rise to greater than a threshold level 316 immediately prior to the base stations transmissions, the process resumes from the beginning 300. The threshold can be determined through experimentation to provide the best system interference performance.

Advantageously, by aligning the transmit duty cycle of a BS with that of its near neighbours in terms of received interference (whether this is from adjacent channel or adjacent site), uncoordinated TDD networks can operate will reduce interference. Depending on circumstances, this can: increase throughput; increase range; improve spectral efficiency, and/or reduce interference generated for its neighbors. Further, the present invention allows systems in proximity to each other to become coordinated without any central directing mechanism. This is accomplished in such a manner that the networks can cope with sudden changes in circumstance, such as mobility of MS, etc.

Although the preferred embodiment of the present invention is described with reference to base stations in a cell-based wireless communication system, it will be appreciated that the inventive concepts hereinbefore described are equally applicable to any wireless communication system where interference exists between any type of communication units.

Although the preferred embodiment of the present invention is described with regard to interference on a time slots or time frames, it is also within the contemplation of the invention that the resource where interference can be reduced could be frequency channels in a frequency division multiple access system or codes in a code division multiple access system.

Advantageously, the present invention allow a base station to synchronize itself to uncoordinated infrastructure in its locality, in order to reduce the overall level of interference for a TDD system by getting the base station to assess the time profile of the interference power on the channel(s), and aligning the base station transmit duty cycle to the maximum interference power.

It will be understood that the terms and expressions used herein have the ordinary meaning as is accorded to such terms and expressions by persons skilled in the field of the invention as set forth above except where specific meanings have otherwise been set forth herein.

The sequences and methods shown and described herein can be carried out in a different order than those described. The particular sequences, functions, and operations depicted in the drawings are merely illustrative of one or more embodiments of the invention, and other implementations will be apparent to those of ordinary skill in the art. The drawings are intended to illustrate various implementations of the invention that can be understood and appropriately carried out by those of ordinary skill in the art. Any arrangement, which is calculated to achieve the same purpose, may be substituted for the specific embodiments shown.

The invention can be implemented in any suitable form including hardware, software, firmware or any combination of these. The invention may optionally be implemented partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality.

What is claimed is:

1. A method for synchronization between uncoordinated Time Division Duplex communication networks, the method comprising the steps of:
   measuring an interference level on channels available to a base station;
   choosing a channel having a lowest interference level;
   determining that the interference is from a base station;
   calculating an interference profile over a frame cycle;
   establishing a peak interference level; and
   aligning a base station frame timing in response to the peak interference level;
   wherein the aligning step includes timing a rising edge of base station transmissions to coincide with a rising edge of the peak interference level.

2. The method of claim 1 further comprising the steps of:
   pseudo-randomly ceasing transmissions;
   re-calculating the interference profile over a frame cycle; and
   if a timing position of the peak interference level has shifted, slewing the base station frame timing to re-align with the peak interference level in a manner which permits mobile stations served by the base station to remain synchronized therewith.

3. The method of claim 1 further comprising the steps of:
   establishing that no mobile stations are transmitting on an uplink;
   monitoring interference power immediately prior to base station transmissions; and
   if the interference level rises to greater than a threshold level immediately prior to the base stations transmissions, slewing the base station frame timing to be earlier than the present frame timing in the frame cycle.

4. A method for synchronization between uncoordinated Time Division Duplex communication networks, the method comprising the steps of:
   measuring an interference level on channels available to a base station;
   choosing a channel having a lowest time-averaged interference level for one receive cycle of the base station;
   determining whether the interference is from a base station;
   calculating an interference profile over a frame cycle;
   establishing a peak interference level; and
   aligning a base station frame timing in response to the peak interference level by timing a rising edge of base station transmissions to coincide with a rising edge of the peak interference level.

5. The method of claim 4 wherein the calculating step is performed on a chip-by-chip time basis.

6. The method of claim 4 wherein the determining step determines whether the interference is from a base station by analyzing a transmission pattern of an interferer.

7. A base station operable to synchronize to a Time Division Duplex (TDD) communication network of a communication system that comprises one or more uncoordinated TDD communication networks supporting communications for a plurality of mobile stations, the base station comprising:
   a receiver operable to measure an interference level on channels available to the base station;
   a processor coupled to the receiver, the processor operable to choose a channel having a lowest interference level, determine that the interference is from a base station, calculate an interference profile over a frame cycle, establish a peak interference level; and
   a transmitter coupled to the processor, the transmitter operable to align a base station frame timing in response to the peak interference level;
   wherein the processor directs the transmitter to time a rising edge of base station transmissions to coincide with a rising edge of the peak interference level.

8. The base station of claim 7 wherein the processor further pseudo-randomly directs the transmitter to cease transmissions, whereupon the processor re-calculates the interference profile over a frame cycle, and if a timing position of the peak interference level has shifted, the processor directs the transmitter to slew the base station frame timing to re-align with the peak interference level in a manner which permits mobile stations served by the base station to remain synchronized therewith.

9. The base station of claim 7 wherein the processor further establishes that no mobile stations are transmitting on an uplink, directs the receiver to monitor interference power immediately prior to transmitter transmissions, and if the interference level rises to greater than a threshold level immediately prior to the transmitter transmissions, the processor directs the transmitter to slew the base station frame timing to be earlier than the present frame timing in the frame cycle.

* * * * *